United States Patent
Caplan et al.

[19]

[11] Patent Number: 5,807,485
[45] Date of Patent: Sep. 15, 1998

[54] SHIPBOARD FIXED-BED BIOREACTOR SYSTEM

[75] Inventors: Jason A. Caplan; Donald W. Kelemen, both of Raleigh, N.C.

[73] Assignee: Ensolve Biosystems, Inc., Raleigh, N.C.

[21] Appl. No.: 791,788

[22] Filed: Jan. 29, 1997

[51] Int. Cl.⁶ .................................................. C02F 3/06
[52] U.S. Cl. .......................... 210/610; 210/618; 210/620; 210/150; 210/196; 210/205
[58] Field of Search ..................... 210/610, 611, 210/615–618, 620–623, 747, 150, 151, 194, 195.1, 196, 205, 220, 241, 908, 909

[56] References Cited

U.S. PATENT DOCUMENTS

| | | | |
|---|---|---|---|
| 3,913,513 | 10/1975 | Pedone | 210/194 |
| 3,937,662 | 2/1976 | Bartik | 210/747 |
| 4,021,338 | 5/1977 | Haskin | 210/747 |
| 4,530,131 | 7/1985 | Zell et al. | 210/196 |
| 4,952,314 | 8/1990 | Saab | 210/610 |
| 5,173,092 | 12/1992 | Rudder | 210/747 |
| 5,254,253 | 10/1993 | Behmann | 210/151 |

*Primary Examiner*—Thomas G. Wyse
*Attorney, Agent, or Firm*—Charles W. Calkins; Kilpatrick Stockton LLP

[57] ABSTRACT

Disclosed is an apparatus and method for the continuous biological treatment of ship bilge water contaminated with petroleum and biodegradable materials. The apparatus includes a pumping system attached directly to the bilge or to an oil-water phase separator, for removing the biodegradable material(s) contained in the bilge waste aqueous phase, which is integrated with a means for microbiologically treating the contaminated bilge water. The means for microbiologically treating the contaminated bilge water preferably includes petroleum- and hazardous-degrading microorganisms. In operation, a phase separator system on the ship separates the free-product phase from the contaminated bilge water. The separated free-product is removed for off-site disposal. Contaminated bilge water is fed into the microbiological treatment system for further treatment with eventual discharge overboard or recirculation into the contaminated bilge area.

10 Claims, 5 Drawing Sheets

SHIPBOARD FIXED-BED BIOREACTOR SYSTEM

FIELD OF THE INVENTION

The present invention relates to a method and apparatus for treating ship bilge water contaminated with petroleum or biodegradable materials. More particularly, the invention relates to a method and apparatus for microbiologically remediating petroleum and biodegradable materials in ship bilge compartments.

BACKGROUND

The shipping industry and military generate millions of gallons per year of bilge water contaminated with petroleum hydrocarbon and/or hazardous pollutants. The direct discharge of this contaminated bilge water from commercial and non-commercial shipping vessels into the world's oceans and lakes is a universal environmental problem. Currently, the majority of such bilge wastes is processed through on-board oil/water phase separators. The separated oil is either stored in containers or pumped back to the bilge. The separated water is either sent overboard or back in the bilge area. However, the water that is processed by such separators often exceeds international and domestic regulatory standards for legal discharge. Local and international laws impose severe fines and/or imprisonment if ships discharge bilge waste while in harbor areas. Ship owners must dispose of the contaminated bilge water by costly and inconvenient methods such as pump, haul, and incineration. On shore, the storage and transportation of such bilge wastes requires countless tanks and pipelines. Substances typically processed and stored at these facilities include petroleum distillates, industrial solvents, and oily bilge wastes. Due to the dangers presented by storing and transporting concentrated solutions of these materials, engineers and government agencies conduct extensive research and development to insure the tanks and pipelines used will effectively and safely contain these materials. Weathering and unforeseen engineering limitations, however, often cause the facilities to fail, resulting in the release of chemicals into the environment from on-shore storage facilities.

The release of concentrated bilge wastes typically cause extensive damage to the local ecosystem by contaminating or killing indigenous plant and animal life. More remote ecosystems may be affected if the contamination migrates away from the site of ship discharge.

Currently, the primary on-board method used to handle contaminated bilge water is via a phase separator, whereby oil is skimmed or separated from the water and sent back to the bilge. The water phase is subsequently discharged overboard. A major problem with this approach is that concentrations of petroleum hydrocarbon contaminants from the water phase often exceed the regulatory-allowed limits for discharge into open waters. The reasons for poor separator performance vary but include the typical presence of engine-cleaning detergents and other substances that emulsify oil into water, thereby allowing a higher percentage of oil to become associated with the aqueous phase. Ship agitation and inefficient phase separators allow significant amounts of petroleum to enter the aqueous phase as well. The net effect of these events is that relatively high amounts of petroleum are discharged directly into the surrounding waters, thereby posing significant environmental risks as cited earlier.

U.S. Pat. Nos. 3,846,290, 4,385,121, 4,765,902, 4,992,174, and 5,080,782 disclose methods for reducing the amount of petroleum hydrocarbons in a solution. Although these methods achieve remediation in soil and groundwater environments, the methods are disadvantageous for cleanup of bilge wastes for a number of reasons. First, the equipment used is often large and cumbersome. This type of equipment would not be appropriate for ship environments because of space constraints often encountered in ships. A second reason pertains to the hydrocarbon-degrading microorganisms used to degrade the contaminants associated with bilge water. Although indigenous microbial populations may be sufficient in terrestrial environments to biodegrade petroleum hydrocarbons that may have contaminated it, such microorganisms may not be present in the bilge environment. Because the oil/water mixture is periodically removed from the ship as a normal part of cleaning operations, any hydrocarbon-degrading microorganisms which may be present would also be removed in the process. Thirdly, terrestrial/groundwater bioreactor systems are not designed to treat oil contaminated with surfactants and cleansers often associated with bilge wastes. And fourthly, hydrocarbon-degrading microorganisms associated with terrestrial environments are typically not efficient degraders in surface water environments (i.e., saltwater).

U.S. Pat. No. 5,254,253 to Behmann describes the use of an onboard activated sludge bioreactor combined with nutrients obtained from raw sewage ("black water" from toilets) and wastewater from showers, sinks, and kitchen facilities ("grey water") to biodegrade bilge oils. Although the method achieves some reductions of petroleum hydrocarbons, there are several drawbacks of this approach. First, the mixing of "black" and "grey" water to achieve optimal nutrient concentrations in the activated sludge bioreactor is not practical due to the inconsistent amount of nitrogen present in these materials. Second, appropriate concentrations of phosphate are not found in these "black" and "grey" waters to allow complete metabolism of petroleum hydrocarbons to occur. Third, activated sludge systems generate considerable sludge material (i.e., solids) which are cumbersome to deal with and expensive to dispose. Fourth, pathogenic microorganisms are often associated with "black" water wastes which present a risk to both humans and the environment when such water is discharged to open waters U.S. Pat. No. 3,941,692 whereby Gutnick et al. describes the application of microorganisms and nutrients to biodegrade residual oil in the emptied cargo compartments. This method involves the addition of microbes rather than the utilization of an on-site bioreactor. There are several limitations of this approach. First, the absence of a bioreactor limits the amount of dissolved oxygen required to complete metabolism of petroleum hydrocarbons. The method of the '692 patent is essentially an activated sludge batch reactor which is less efficient than continuous flow fixed-film bioreactors for the reasons cited earlier. In addition, the method does not allow control of the amount of hydrocarbon present in any given cargo compartment. High levels of petroleum hydrocarbons may be toxic or indigestible to microorganisms introduced into these compartments, whereas the current invention allows for the control of petroleum hydrocarbon concentrations being treated. Thirdly, there are no provisions for accurately maintaining the required nutrients within the cargo compartment in the method of the '692 patent.

Accordingly, there is a need for a method and apparatus for the bioremediation of bilge water contaminated with petroleum and/or other hazardous substances.

Further, there is a need for a method and apparatus capable of commencing bioremediation within a short period after treatment system installation.

In addition, there is a need for a method and apparatus which permits continual, efficient treatment of contaminated bilge water by protecting the treating microbial inoculum from toxic overloading of the contamination, and generating an increased rate of remediation in the bilge waste environment.

Still further, there is a need for a method and apparatus which treats surficial petroleum hydrocarbon contaminated waters immediately surrounding the ship.

SUMMARY OF THE INVENTION

The present invention meets the foregoing needs by providing an apparatus and method for the biological treatment of bilge water contaminated with a biodegradable material, for example a petroleum product or a hazardous substance, i.e., a substance which may be classified as toxic, corrosive, irritants, flammable or combustible, or generating pressure in the course of decomposition. The basic approach is to treat the contaminated bilge waste using an interactive system comprising, in combination, a pumping system from the phase separator located in the bilge or on the shipping vessel, which separates the aqueous from non-aqueous (e.g., petroleum or hazardous substances) phases and a vessel, i.e., bioreactor, which removes dissolved constituents of the biodegradable material in the bilge water. The bioreactor contains a culture of indigenous, genetically engineered, or enriched bacteria. When constructed and operated as disclosed herein the invention provides a fast and efficient means for remediating contaminated bilge water.

The apparatus generally includes a piping and pumping system, for removing contaminated bilge water containing a dispersion of the biodegradable material, a vessel, i.e., a bioreactor, for treating the removed bilge water, and a piping and pumping system for discharging the treated bilge water either overboard or back into the bilge. Preferably, the treated bilge water is discharged overboard if appropriate cleanup standards are achieved.

The bioreactor, preferably containing viable cultures of microorganisms, is maintained by gas and nutrient injection systems. The culture of microorganisms comprises microorganisms fixed to a support media in the vessel and microorganisms, arising from those attached to the support media, which slough off and disperse into the recirculating or discharged bilge water. The microorganisms' method of attachment to the support media is not completely understood. However, experience and the scientific literature suggest that fixed-bed bioreactor systems are more tolerant to fluctuations in contaminant flow and concentrations than are activated sludge systems. Preferably, the microorganisms fixed to the support media regenerate so as to maintain a substantially constant microbial biomass within the vessel. In contrast to the methods disclosed in the patents discussed above, in the method of the present invention, nutrient concentrations for optimal microbial growth and metabolism of petroleum hydrocarbons may be regulated.

After treatment, the bilge water contains dissolved gases and nutrients, as well as those microorganisms sloughed off the support media. This treated water can then be discharged into open waters if regulatory standards are achieved or recirculated into the bilge, whereby the sloughed microorganisms act as a seed culture for stimulating in situ remediation of contaminated bilge water. A secondary benefit of overboard discharging of the microbe-rich effluent from the bioreactor is the possible cleanup of petroleum slicks surrounding the ship.

The process of the present invention may be performed on any ship contaminated by biodegradable materials, including hazardous and non-hazardous substances degradable by microorganisms. Typical biodegradable materials which may be biologically treated using the process of the invention include alcohols, aromatics, carbohydrates, ketones, petroleum hydrocarbons, phenols, phthalates, chemical solvents, chlorinated compounds, detergents, and mixtures thereof.

The microbiological treatment means, operated as described herein, may be used to significantly reduce various concentrations of biodegradable materials dissolved in the bilge water. Further, by integrating the bilge waste pumping system into the apparatus, the microbial culture is substantially protected from toxic overloading of the biodegradable materials. Accordingly, it is possible to continuously treat contaminated bilge water without supplementing the treating culture to replace microorganisms lost due to the introduction of toxic concentrations of biodegradable materials.

BRIEF DESCRIPTION OF THE DRAWINGS

In the Figures, like reference characters indicate corresponding parts.

DETAILED DESCRIPTION OF THE INVENTION

The invention features an apparatus and method for the biological treatment of bilge water contaminated with biodegradable materials.

In one aspect, the present invention provides an apparatus for the microbiological remediation of a site contaminated with a biodegradable material comprising:

means for removing bilge water contaminated with a biodegradable material from below a bilge water/biodegradable material interface, a vessel for treating said removed bilge water to cause the biodegradation of said biodegradable materials, means for discharging the treated bilge water overboard, means comprising a continuously regenerating culture of microorganisms disposed in said vessel, said culture comprising a film of microorganisms which are fixed to a support media in the vessel and microorganisms, arising from said film of fixed microorganisms, which slough off said support media and disperse into the contaminated bilge water;

means for maintaining a flow of contaminated bilgewater over the culture of microorganisms;

means for introducing gases into said vessel to support the growth of the culture of microorganisms; and means for introducing nutrients into said vessel to support the growth of microorganisms.

In another aspect, the present invention provides an apparatus for the microbiological remediation of a site contaminated with a biodegradable material comprising:

means for removing bilge water contaminated with a biodegradable material from below a bilge water/biodegradable material interface, a vessel for treating said removed bilge water to cause the biodegradation of said biodegradable materials, means for recirculating the treated bilge water operative and return said treated bilge water to the contaminated bilge site.

Preferably, the microorganisms fixed to the support media comprise a substantially constant microbial biomass. It is also preferred that the means for introducing gases into said vessel comprises a fine bubble diffuser.

As set forth above, biodegradable materials include, but are not limited to, hazardous and non-hazardous substances including: alcohols, aromatics, carbohydrates, ketones, petroleum hydrocarbons, phenols, phthalates, chemical solvents, chlorinated compounds, detergents and mixtures thereof. In particular, bioremediation utilizing the method of the present invention is effective for the treatment of a wide variety of biodegradable materials commonly used aboard ships and in the shipping industry. Biodegradable materials which may be bioremediated using the process of the invention include; but are not limited to:

(a) alcohols, e.g., isopropanol, ethanol, t-butanol, ethylene glycols;

(b) aromatics, e.g., benzene, toluene, ethylbenzene, xylenes;

(c) carbohydrates, e.g., glucose, fructose;

(d) ketones, e.g., methylethylketone;

(e) petroleum hydrocarbons, e.g., gasoline, diesel, bilge oil, fuel oils, motor oils, crude oil;

(f) hydraulic fluids, e.g., brake fluid, transmission fluid, power steering fluid;

(g) phenols, e.g., chlorophenol;

(h) phthalates, e.g., o-phthalate;

(i) solvents, e.g., methylene chloride, acetone, Stoddard solvent, tetrahydrofuran;

(j) chlorinated compounds, e.g., monochlorobenzene, 1,2-dichloroethane;

(k) detergents;

(l) and mixtures thereof.

It should be recognized, however, that virtually any material which may be biodegraded may be treated using the apparatus and/or method of the present invention.

In the description of the present invention, the terminology "bilge water" is utilized to describe an aqueous composition, for example comprising water and a hazardous substance, which may be treated according to the apparatus and method of the present invention. Bilge water may also include detergents, surfactants and other compositions found in sea or lake water and/or utilized in or around ships. In contrast to prior art oil/water separators, the presence of certain compositions such as detergents in bilge water being treated according to the present invention may beneficially pre-emulsify one or more hazardous substances (e.g. petroleum hydrocarbons) in the bilge water prior to contact with the bioreactor.

Further, as will be understood by those of skill in the art although described with reference to embodiments advantageous for use on ships, the apparatus and method of the present invention may be utilized in other settings to reduce the concentration of a biodegradable substance in aqueous compositions.

The invention includes both bilge waste pumping system and a microbiological treatment means which interact to protect the bioremediating culture from toxic overloading of the biodegradable material during operation, thus insuring continuous and efficient remediation. The interaction of these subunits also produces an increased rate of remediation in the bilge waste environment when compared with other biological, chemical, and physical remediation techniques.

Figure 1:
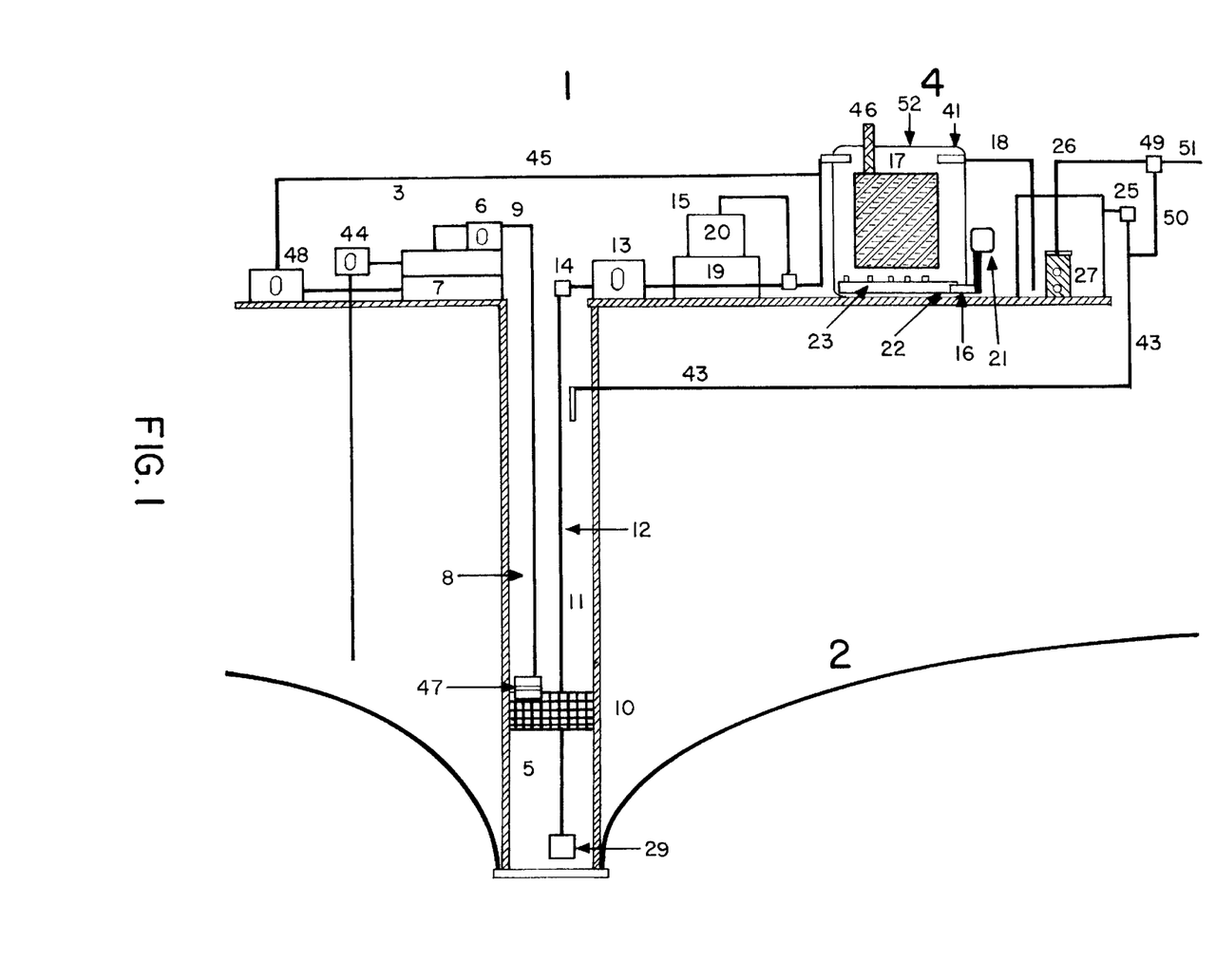
FIG. 1 is a schematic drawing of the remediation apparatus of the invention having a partial cut-away view of a bioreactor useful in the invention.

An embodiment of an apparatus of the present invention is depicted in FIG. 1. Referring to FIG. 1 there is shown a bioremediation apparatus 1 located at a ship bilge site 2. The bioremediation apparatus 1 includes a bilge waste pumping system 3, for removing biodegradable materials located in a separate or separable phase, and a microbiological treatment apparatus 4 for biodegrading contaminants dissolved in bilge water 5.

Bilge waste pumping system 3 preferably comprises a chemical feed pump 6 and collection tank 7 connected to surface floatation device 47, flexible intake pipe 8, and piping system 9. Examples of flexible intake pipe 8 would include self retracting, coiled, convoluted, and corrugated tubing. Surface floatation device 47 maintains pipe 8 in constant contact with interface 10. This flexible recovery system allows for continued product recovery independent of bilge water 5 and product 10 volumes. Recovery site 11 encompasses flexible pipe 8, floatation device 47, bilge water intake pipe 12, and particulate screen 29.

The microbiological treatment system 4 broadly includes bilge water recovery pump 13 connected to intake pipe 14, nutrient addition system 15, gas injection system 16, bioreactor 17, and above bilge effluent piping system 18. A piping system 14 connects intake pipe 12, nutrient addition system 15, and bioreactor 17. Bilge water recovery pump 13 is preferably located proximate to the ship bilge area 2. Bilge water intake pipe 12 is attached to particulate screen 29 located below bilge water/biodegradable material interface 10. Recovery site 11 encompasses flexible intake pipe 8, floatation device 47, and bilge water intake pipe 12. Nutrient addition system 15 includes a reservoir tank 19 and nutrient feed pump 20. Alternatively, slow-release nutrients and pH adjustment chemicals can be provided via containers 46 in lieu of nutrient addition system 15. The gas injection system 16 includes a blower 21; blower 21 pumps gases into the bioreactor 17 through piping 22 and gas distribution system 23. Effluent piping system 18 exits bioreactor 17 and connects to effluent holding tank 24, which terminates within, or proximate to the recovery site 11 by piping system 25 and 43 or effluent discharged overboard by piping system 26 via submersible pump 27. Bioreactor 17 incorporates a water tight lid 52 to prevent spillage of contents during turbulent seas.

Figure 2:
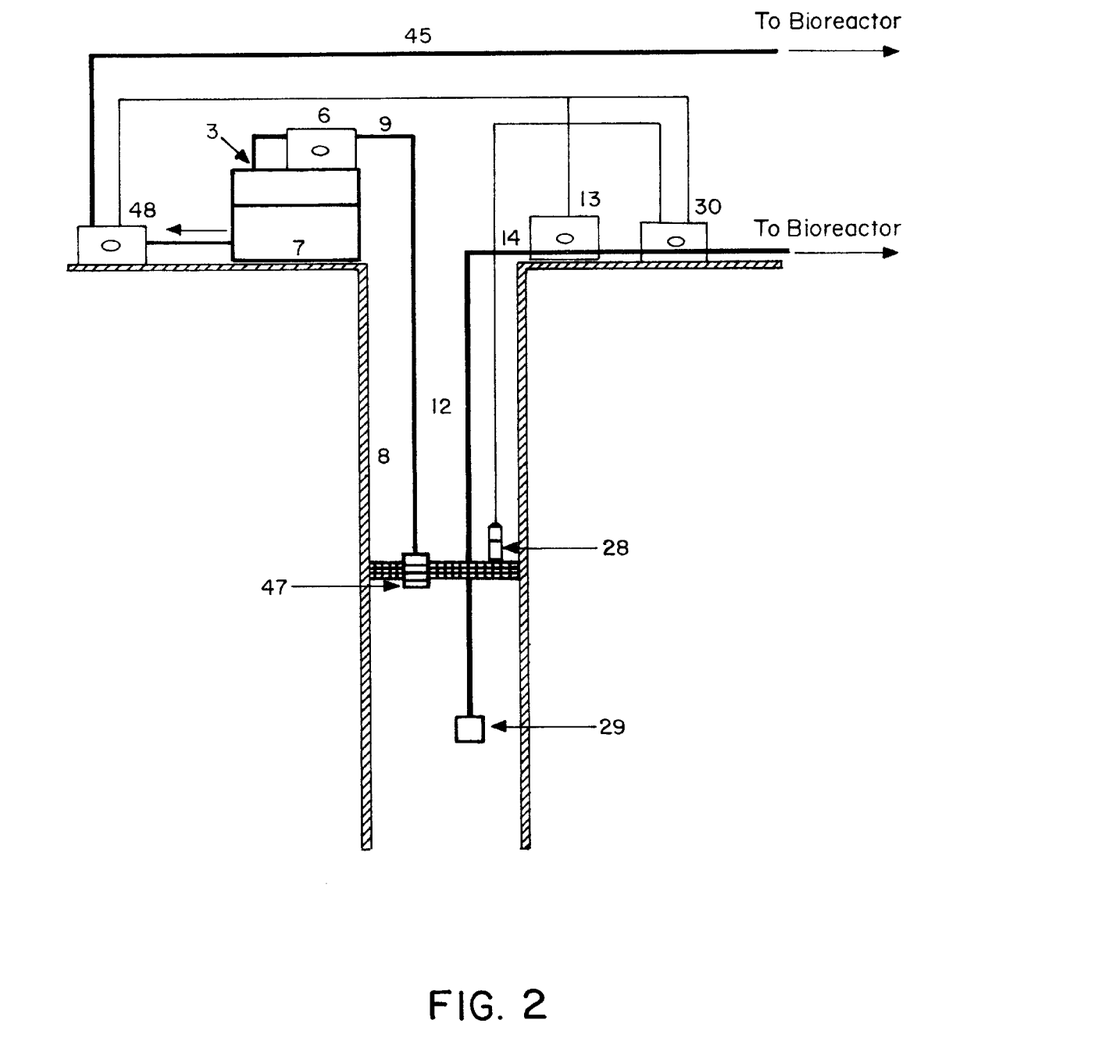
FIG. 2 is a partly schematic illustration of a dual pump bilge waste pumping system useful in the invention.

A bilge waste pumping system 3 which facilitates separation of a two-phase mixture may be employed. Referring to FIG. 2, a bilge waste pumping system 3 may comprise a chemical feed pump 6, connected to collection tank 7, surface floatation device 47, flexible intake pipe 8, and piping system 9. Liquid level control 28, attached to control switch 30, turns bilge pump 13 or 48 on and off depending upon predetermined bilge water volumes. Phase separator pump 48 can be used in place of pump 13 to pump phase separated water from waste pumping system 3 directly to bioreactor 17 via pipe 45. Switch 30 will be used to determine whether pump 13 or pump 48 is used.

Figure 3A:
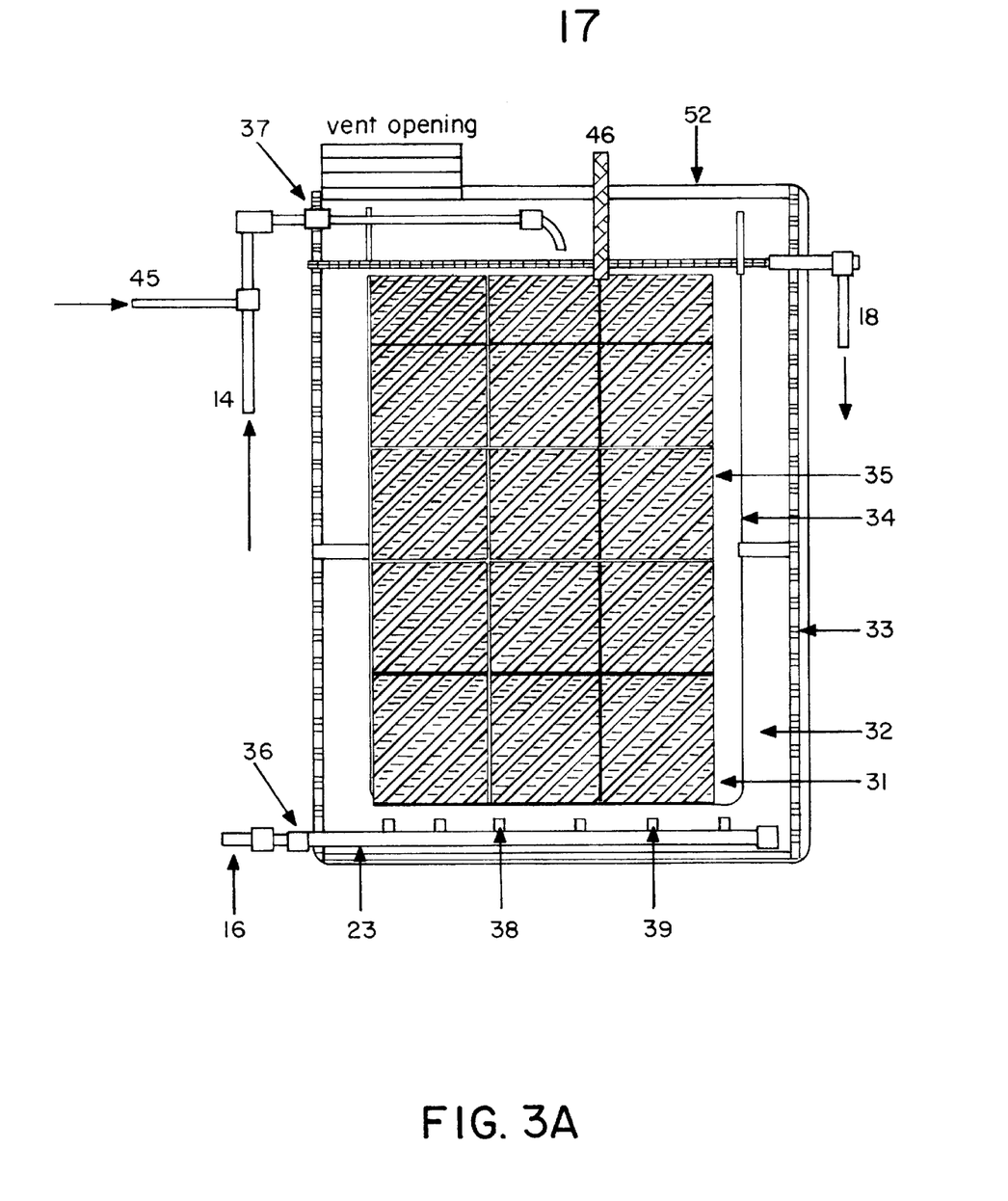
FIG. 3A is a partly schematic, side cross-sectional view of a bioreactor useful in the invention.

FIG. 3A depicts an embodiment of a bioreactor suitable for use in the present invention. Referring to FIG. 3A, the bioreactor 17 of the present invention is a portable vessel, preferably manufactured from explosion proof equipment and circuitry. The configuration of the vessel may be cylindrical, rectangular, or any other shape which conveniently fits on the ship where the system is to be utilized. The volume of the vessel will also depend on the space available on the ship. Different size vessels may be constructed to accommodate varying site requirements. Preferably, bioreactor 17 is sealed with gasket lid 52 to prevent spillage of liquid contents during rough seas and control the escape of volatilized contaminants. Internally, bioreactor 17 may comprise two chambers, a treatment chamber 31 and a clarifier chamber 32. Bioreactor walls 33, in conjunction with internal walls 34 segregate the above chambers.

Treatment chamber 31 may contain gas distribution system 23, pH and nutrient control system 46, microbial support media 35, and a culture of petroleum-degrading microorganisms. The pH control and nutrient delivery system 46 assures optimal growth conditions for microbial activity within chamber 31. Treatment chamber 31 also includes a first coupling 36, through which piping 16 enters bioreactor 17 and a second coupling 37, which receives piping system 14. Preferably coupling 37 is located such that pipe 14 enters above support media 35. Gas distribution system 23 preferably includes a series of alternating pipe "T"s/gas diffusers 38 and interconnecting pipe joints 39. Gas diffusers 38 may be fabricated from porous media, perforated pipe, or prefabricated high efficiency diffusers. To optimize oxygen transfer efficiency, and meet the oxygen demand of the bioremediating culture, an optimal number of gas diffusers 38 having fine (small) pores are installed within treatment chamber 31.

The support media 35 provides a fixed surface to which the bioremediating culture may attach. The media may be manufactured from a semi-rigid material such as polyvinyl-chloride (PVC), however, other materials may be used. The presently preferred material is a media constructed of overlapping corrugated PVC sheets and forming a large surface area porous block structure. Examples of preferred media types are those manufactured by Brentwood Industries, Inc. (trademark AccuPac®) and EnSolve Biosystems, Inc. (tradename EnCharge™).

The regenerative culture of biodegrading microorganisms may comprise bacteria, actinomycetes, fungi, algae, and mixtures thereof. The microorganisms may remain fixed to support media 35 throughout their life span, during growth they may detach from support media 35 and slough off into the contaminated bilge water. The bacteria may be of a species indigenous to the contaminated bilge site 5, genetically engineered, or mixtures of both. Nonpathogenic bacteria are preferred. Typical bacteria useful in the present invention include: Pseudomonas, Flavobacterium, Bacillus, Norcardia, Acinetobacter, Corynebacterium, Achromobacter, Mycobacterium, and Micrococcus. Other biodegradable material and/or petroleum-degrading microorganisms include actinomycetes, algae, and fungi. Also useful are enriched bacterial cultures selected on the basis of their ability to use a given biodegradable material as their sole carbon source. As will be appreciated by those skilled in the art, cultures of genetically engineered or otherwise enriched bacteria designed to use the given contaminating biodegradable material as their sole carbon source, results in faster remediation at lower costs than other currently available technologies.

Figure 3B:
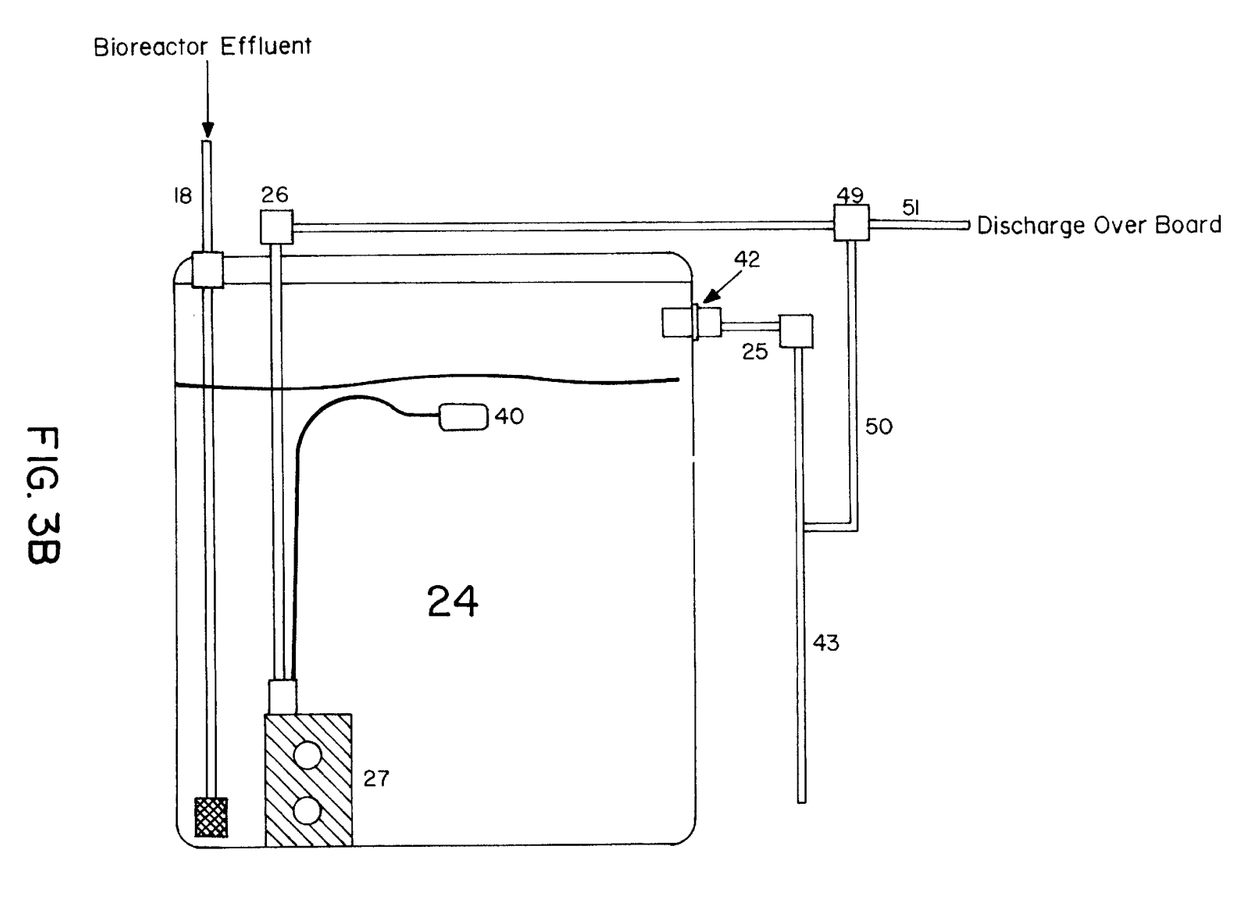
FIG. 3B is a partly schematic, side cross-sectional view of an effluent holding/discharge tank useful in the invention.

Referring to FIG. 3B, the effluent holding/discharge tank 24 contains a submersible effluent pump 27 that is connected to discharge piping 26 and activated by liquid level control switch 40. Alternately, the effluent may be recirculated back to the bilge area 2 via directional valve 49, piping 50 and overflow piping system 43. Submersible pump 27 may be any low volume pump suitable for submersible use. Effluent piping 18 which exits bioreactor 17 at coupling 41 connects to the effluent holding/discharge tank 24. Effluent discharge piping 26 connects to the submersible effluent pump 27. Pipe 51 is connected to ship piping system (not shown) for discharge of effluent over board. Overflow piping 25 which exits effluent holding/discharge tank 24 at coupling 42 connects to overflow piping system 43 for overflow draining into bilge area 11. Liquid level control in the effluent holding/discharge tank 24 is maintained below coupling 42 by submersible pump 27 via liquid level control switch 40. The purpose of coupling 42 is to allow effluent discharge should failure of submersible pump 27 or liquid level control switch 40 occur.

In operation the bilge waste pumping system 3 and microbiological treatment system 4 interact to efficiently and quickly biodegrade contaminated bilge water 5. In particular, by removing the nonaqueous organic phase, i.e., phase separated product, bilge waste pumping system 3 protects the microbial culture from toxic overloading of the biodegradable material. In addition, removal of the organic phase prevents it from acting as a reservoir of contaminants capable of maintaining the concentration of contaminants in the bilge water at pre-bioremediation levels for extended periods. These features permit users to maintain substantially continuous microorganism regeneration and biodegradation of contaminants in the bilge water, thereby producing an efficient, safe, and fast-acting bioremediation system.

Upon arrival at the ships' bilge site 2 at recovery site 11, the operator arranges the apparatus as described above. The operator fills bioreactor 17 with recovered bilge water, engages blower 21, and introduces unacclimated activated sludge into the treatment chamber 31 of bioreactor 17. As a result of interactions between the microbial population and the support media 35, a significant portion of the microorganisms in the sludge attach to support media 35.

Preferably, the bacterial culture is then supplemented with a bacterial culture which is acclimated to, and selectively degrades the biodegradable material. The culture is permitted to grow for approximately 24–48 hours before flow through of contaminated bilge water from the bilge waste pumping system 3 and/or 13 is initiated.

Figure 4:
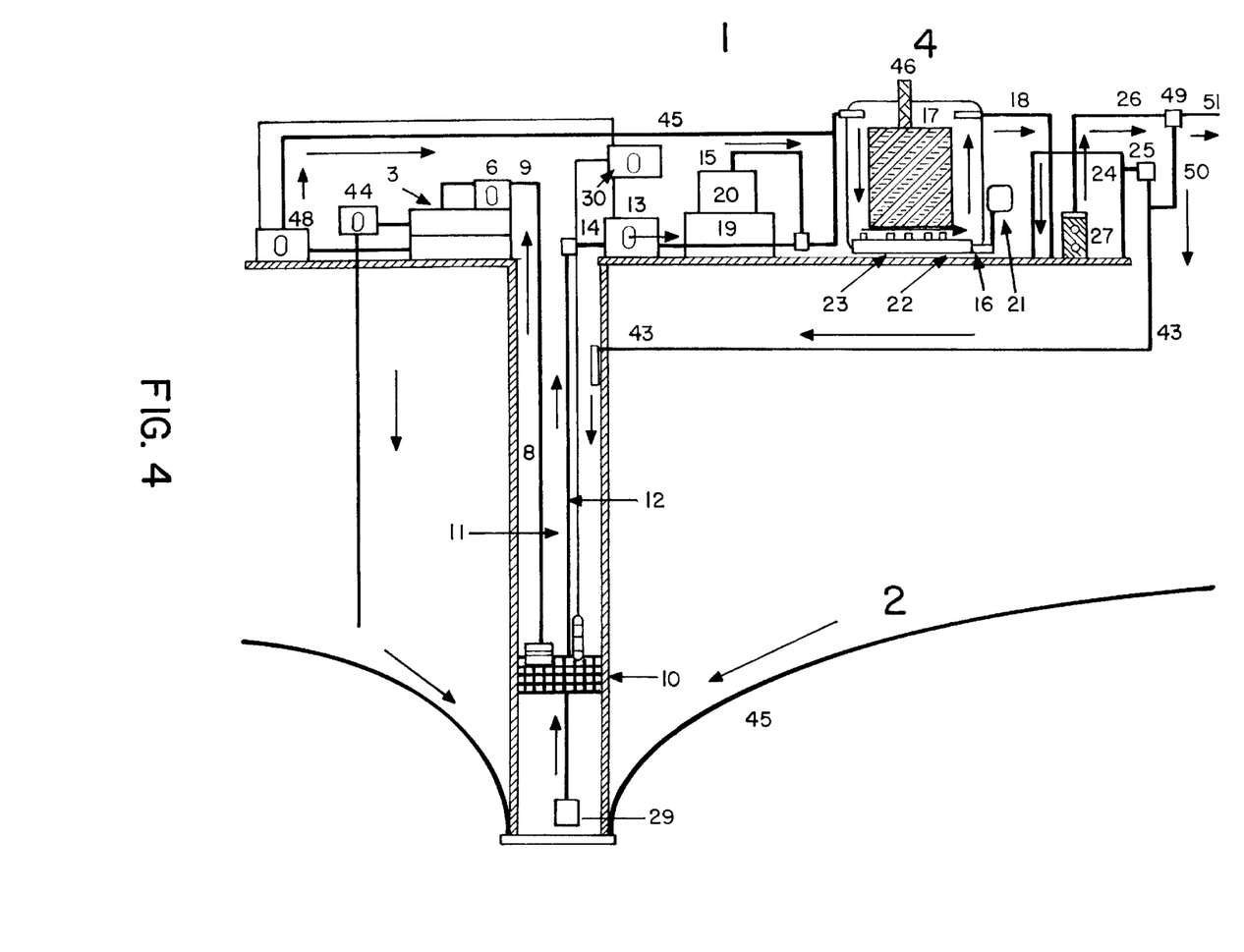
FIG. 4 is a schematic illustration of the flow of contaminated bilge water through the bilge waste pump system of FIG. 2 and the bioreactor.

Activation of the bioremediation apparatus 1 starts the bilge water bioremediation flow depicted in FIG. 4. Referring to FIG. 4, a bioremediation apparatus 1, having an integrated bilge waste pumping system 3 and microbial remediation system 4, is depicted. The bilge waste pumping system 3 and the microbiological treatment system 4 operate concurrently. To commence operation, contaminated bilge water is pumped into the microbiological treatment system 4 by pump 13 via line 12 and 14. Alternately, phase separator pump 48 can be used in place of pump 13 to pump phase separated water from waste pumping system 3 directly to bioreactor 17 via pipe 45. Switch 30 will be used to determine whether pump 13 or pump 48 is used. As the contaminated bilge water flows through the piping system 14 it is supplemented with a nutrient mixture pumped by nutrient feed pump 20 from tank 19. Alternatively, slow-release nutrients and pH adjustment chemicals can be provided via containers 46. Containers 46 are used in lieu of nutrient addition system 15 and do not require the use of a pump or mixer. Container 46 may comprise a tube or other vessel which includes means, such as holes, which allow the passage of bilge water into and out of the container. Container 46 includes nutrients, and/or pH adjusing materials, which are released into the bilge water due to the action of the bilge water passing into and out of the container.

Nutrients may contain appropriate concentrations of nitrogen, phosphorus, and, optionally, other inorganic salts necessary for maintenance of enhanced bioactivity. Preferred nitrogen containing compounds are $NH_4Cl$, $NH_4NO_3$, $NaNO_3$, or $(NH_4)_2SO_4$, although urea or urea-formaldehyde may also be used. Phosphorus is readily provided as $KH_2PO_4$, $NaHPO_4$, $Na_2HPO_4$, and the like.

After enrichment with nutrients, the bilge water flows into treatment chamber 31 of bioreactor 17. Concurrent with the introduction of bilge water, gas distribution system 23 forces air into treatment chamber 31 in the form of fine (small) bubbles. The diffused air dissolves into the bilge water. In bioreactor 17, the bilge water flows through support media 35 contacting bacterial culture fixed thereto. In response to the injection of nutrients and contaminants, the bacterial culture grows and biodegrades the contaminants. The majority of the microorganisms remain fixed to support media 35 as the bilge water flows over the support media 35. Some of the microorganisms, however detach from, or slough off, the media 35 and disperse into bilge water. The fixed microorganisms continually grow replacing those microorganisms sloughed off, continual growth by the fixed microbial cell population results in a substantially constant microbial biomass within the bioreactor 17. Upon reaching the bottom of the treatment chamber 31, the now treated bilge water flows laterally into clarifier chamber 32. Gradually, clarifier chamber 32 fills with treated bilge water until treated bilge water exits bioreactor 17 through piping 18.

The treated bilge water, which contains dissolved gases, nutrients, and microorganisms, fills effluent holding/discharge tank 24 until the treated water surface reaches liquid-level control 40. Level control 40 is activated at a preset point and turns effluent pump 27 on. The effluent may be recirculated back to the bilge area 2 via directional valve 49, piping 50 and overflow piping system 43. Alternatively, effluent may be discharged overboard via piping system 51.

In operation, pumping system 3 selectively removes free-product phase 10. Liquid level control 28, attached to bilge water pump 13, turns bilge pump on and off depending upon predetermined bilge water volumes. Alternately, phase separator pump 48 can be used in place of pump 13 to pump phase separated water from collection tank 7 from waste pumping system 3 directly to bioreactor 17 via pipe 45. Switch 30 will be used to determine whether pump 13 or pump 48 is used. Phase separated product 10 is pumped by chemical feed pump 6 into collection tank 7, via flexible intake pipe 8 and piping system 9. As the tank fills, bilge oil is drained by pump 44 and discharged into bilge area 2 until proper off-site disposal is available. Bilge water pump 13 draws bilge water up intake pipe 12, into piping system 14, and eventually into bioreactor 17. Bioreactor 17 functions to bioremediate the bilge water contaminants as describe above. Bioremediation following the above procedures may be performed at ambient temperatures. Those skilled in the art will appreciate, however, that bioremediation is more efficient at the optimum temperatures for microorganisms growth and biodegradation. The preferred temperature may be determined empirically. Accordingly, to insure the maintenance of preferred temperatures in colder climates, the apparatus may be equipped with heating units (not shown) and insulation.

Upon release into the bilge area site 2, the recirculated microorganisms provide a seed culture for performing in situ bioremediation. Specifically, the microorganisms biodegrade contaminants dispersed in the resident bilge water 5. Preferably, the recirculated microorganisms flow toward intake pipe 12, thus establishing a closed-loop (or complete) bioremediation circulatory system.

The apparatus of the present invention has several advantages resulting from the integration of the bilge waste pumping systems 3 and 13 in conjunction with microbiological treatment system 4. As opposed to prior art, bioremediation of bilge wastes permits faster and more efficient cleaning of bilges. Further, by integrating a bilge waste pumping system 3 or 13 into the apparatus 1, the removal of potentially toxic concentrations of phase separated product prior to entrance into the bioreactor is insured, thus protecting the microbial culture from toxic overloading of the biodegradable material. The removal of the phase separated product also prevents this material from increasing the contaminant's concentration in the bilge water. These features permit users to maintain substantially continuous microorganisms regeneration and biodegradation both above-bilge and in situ. Thus, the combination of these systems produces an efficient, safe, and fast-acting bioremediation system.

The present invention also provides methods for biological treatment of bilge water contaminated with hazardous wastes. In one aspect, the present invention provides a process for the microbiological remediation of a bilge contaminated with a biodegradable material comprising the steps of:

removing bilge water contaminated with a biodegradable material from below a bilge water/biodegradable material interface;

supplementing said removed bilge water with gases and a blend of nutrients in a vessel to enhance the growth of biodegradable material biodegrading microorganisms;

treating said bilge water by concurrently culturing said microorganisms in said supplemented bilge water and biodegrading the biodegradable material therein, said treatment producing a culture of microorganisms comprising a film of microorganisms which remain fixed to a support media in the vessel, and microorganisms, arising from said fixed film, which slough off said support media and disperse into the bilge water;

recirculating said treated bilge water containing nutrients, dissolved gases, and said sloughed off microorganisms to a location proximate to the contaminated bilge area; and permitting the sloughed off microorganisms to perform in situ biodegradation within the site after recirculation proximate to said biodegradable material contaminated bilge area;

whereby said process continuously remediates a biodegradable material dissolved in said bilge water and provides a substantially continuous seed culture, for in situ remediation of said bilge area, which biodegrades biodegradable materials dissolved in the bilge water located at said contaminated bilge. Preferably the treatment step further comprises producing a substantially constant microbial biomass fixed to said support media. It is also preferred that the treatment step permits the microorganisms to slough off said support media at a substantially constant rate. Further, it is preferred that the treatment step further comprises a means for discharging said treated bilge water to the surrounding ship's waters for the purpose of bioremediation of said waters.

The process of the present invention advantageously allows the in situ separation of phase separated product from bilge water, thereby circumventing the necessity of an above-bilge phase separator.

In addition, the process of the present invention advantageously allows for the passive delivery of nutrients to said microorganisms without the necessity of pumps and mixers. In particular, the present invention provides a process for supplying nutrients to an aqueous system including microorganisms, the process comprising:

supplying nutrients to a container adapted to allow the passage of the aqueous system into and out of the inside of the container, wherein the passage of the aqueous system into and out of the container causes the release of nutrients from the container into the aqueous system. In the bioreactor embodiment discussed above, the passage of the aqueous system (bilge water) into and out of the container causes the release of nutrients from the container into the bioreactor. Alternatively said containers may be placed inline before or after the bioreactor for the purpose of adjusting nutrients level in the bioreactor and/or effluent.

Further, the process of the present invention allows for the passive delivery of pH adjustment chemicals to said microorganisms without the necessity of pumps and mixers. In particular, the present invention provides a process for supplying pH adjusting chemicals to an aqueous system, the process comprising:

supplying pH adjusting chemicals to a container adapted to allow the passage of the aqueous system into and out of the inside of the container, wherein the passage of the aqueous system into and out of the container causes the release of pH adjusting chemicals from the container into the aqueous system. In the bioreactor embodiment discussed above, the passage of the aqueous system (bilge water) into and out of the container causes the release of pH adjusting chemicals from the container into the bioreactor. Alternatively said containers may be placed inline before or after the bioreactor for the purpose of adjusting the pH level in the bioreactor and/or effluent.

The features and advantages of the apparatus and processes of the present invention are further illustrated by the following Example.

EXAMPLE

A bilge water bioreactor system according to the present invention was constructed in a maritime vessel in order to evaluate the effectiveness of the system in reducing the level of hydrocarbons in the bilge water of the vessel. The configuration of the bioreactor system was substantially the same as the configuration depicted in FIGS. 1, 2, 3A and 3B. The flow of bilge water through the system was substantially the same as shown in FIG. 4.

A 500 gallon bilge bioreactor was utilized and the average flow rate through the bioreactor was 0.8 to 1.0 liter/min. This flow rate corresponds to treating 1152 to 1440 liters (approximately 300 to 400 gallons) of bilge water per day. The bacteria genera incorporated in the bioreactor system included Pseudomonas, Comamonas, Bacillus and Flavobacterium.

Samples were taken from the influent (bilge water prior to treatment in the bioreactor) and the effluent (post-treatment discharge from the bioreactor) and extracted using U.S. Environmental Protection Agency Method 3550. The level of hydrocarbons (total hydrocarbon concentration) in each sample was measured by gas chromatography utilizing U.S. Environmental Protection Agency Method 8015.

The bilge water bioreactor system was operated for a total of 70 days. The total hydrocarbon concentration level of the influent varied from 8 ppm (parts per million) to 82 ppm. Fluctuations in the influent hydrocarbon concentration were due to various factors including: mixing of bilge wastes; amounts of detergents or wash water entering the bilge area; and the degree of in situ biodegradation occurring within the bilge area.

During the period of operation of the bioreactor system, the total hydrocarbon concentration level of the effluent varied from 3.3 ppm to less than 1.0 ppm, well below the current U.S. Coast Guard criteria of 15 ppm. These results indicate that the bioreactor system of the present invention, including the process and apparatus of the present invention, was effective in the bioremediation of bilge water contaminated with petroleum.

It will thus be seen that the objects set forth, among those made apparent from the preceding description, are efficiently obtained and, since certain changes may be made in carrying out the above embodiments and in the composition and method set forth, without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An apparatus for the microbiological remediation of a site contaminated with a biodegradable material comprising:

means for removing bilge water contaminated with a biodegradable material from below a bilge water/biodegradable material interface;

a vessel for treating said removed bilge water to cause the biodegradation of said biodegradable materials;

means for discharging the treated bilge water overboard;

means comprising a continuously regenerating culture of microorganisms disposed in said vessel, said culture comprising a film of microorganisms which are fixed to a support media in the vessel and microorganisms, arising from said film of fixed microorganisms, which slough off said support media and disperse into the contaminated bilge water;

means for maintaining a flow of contaminated bilge water over the culture of microorganisms;

means for introducing gases into said vessel to support the growth of the culture of microorganisms; and means for introducing nutrients into said vessel to support the growth of microorganisms.

2. An apparatus for the microbiological remediation of a site contaminated with a biodegradable material comprising:

means for removing bilge water contaminated with a biodegradable material from below a bilge water/biodegradable material interface;

a vessel for treating said removed bilge water to cause the biodegradation of said biodegradable materials;

means for recirculating the treated bilge water operative and return said treated bilge water to the contaminated bilge site;

means comprising a continuously regenerating culture of microorganisms disposed in said vessel, said culture comprising a film of microorganisms which are fixed to a support media in the vessel and microorganisms, arising from said film of fixed microorganisms, which slough off said support media and disperse into the contaminated bilge water; and means for delivering bilge water containing nutrients, dissolved gases and microorganisms which slough off said support media to said means for recirculating and into said contaminated bilge water within the contaminated bilge area;

whereby said culture provides both biodegradation of biodegradable material in said removed water and a substantially continuous feed of seed culture for in situ remediation of the bilge area which biodegrades biodegradable materials dissolved in the bilge water located at said contaminated bilge area.

3. The apparatus of claim 1 wherein the microorganisms fixed to the support media comprise a substantially constant microbial biomass.

4. The apparatus of claim 1 wherein said means for introducing gases into said vessel comprises a fine bubble diffuser.

5. A process for the microbiological remediation of a bilge contaminated with a biodegradable material comprising the steps of:

removing bilge water contaminated with a biodegradable material from below a bilge water/biodegradable material interface;

supplementing said removed bilge water with gases and a blend of nutrients in a vessel to enhance the growth of biodegradable material biodegrading microorganisms;

treating said bilge water by concurrently culturing said microorganisms in said supplemented bilge water and biodegrading the biodegradable material therein, said treatment producing a culture of microorganisms comprising a film of microorganisms which remain fixed to a support media in the vessel, and microorganisms, arising from said fixed film, which slough off said support media and disperse into the bilge water;

recirculating said treated bilge water containing nutrients, dissolved gases, and said sloughed off microorganisms to a location proximate to the contaminated bilge area; and permitting the sloughed off microorganisms to perform in situ biodegradation within the site after recirculation proximate to said biodegradable material contaminated bilge area;

whereby said process continuously remediates a biodegradable material dissolved in said bilge water and provides a substantially continuous seed culture, for in situ remediation of said bilge area, which biodegrades biodegradable materials dissolved in the bilge water located at said contaminated bilge.

6. The process of claim 5 wherein said treatment step further comprises producing a substantially constant microbial biomass fixed to said support media.

7. The process of claim 5 wherein said treatment step further comprises permitting the microorganisms to slough off said support media at a substantially constant rate.

8. The process of claim 5 wherein the biodegradable material biodegraded by said microorganisms is selected from the group consisting of alcohols, aromatics, carbohydrates, ketones, petroleum hydrocarbons, hydraulic fluids, phenols, phthalates, solvents, chlorinated compounds, detergents, and mixtures thereof.

9. A process for the in situ separation of phase separated product from bilge water, comprising:

removing bilge water contaminated with a biodegradable material from below a bilge water/biodegradable material interface;

supplementing said removed bilge water with gases and a blend of nutrients in a vessel to enhance the growth of biodegradable material biodegrading microorganisms;

treating said bilge water by concurrently culturing said microorganisms in said supplemented bilge water and biodegrading the biodegradable material therein, said treatment producing a culture of microorganisms comprising a film of microorganisms which remain fixed to a support media in the vessel, and microorganisms, arising from said fixed film, which slough off said support media and disperse into the bilge water;

recirculating said treated bilge water containing nutrients, dissolved gases, and said sloughed off microorganisms to a location proximate to the contaminated bilge area; and permitting the sloughed off microorganisms to perform in situ biodegradation within the site after recirculation proximate to said biodegradable material contaminated bilge area;

whereby said process continuously remediates a biodegradable material dissolved in said bilge water and provides a substantially continuous seed culture, for in situ remediation of said bilge area, which biodegrades biodegradable materials dissolved in the bilge water located at said contaminated bilge.

10. The process of claim 5 wherein said treatment step further comprises a means for discharging said treated bilge water to the surrounding ship's waters for the purpose of bioremediation of said waters.

* * * * *